United States Patent [19]
Kintz et al.

[11] Patent Number: 5,747,792
[45] Date of Patent: May 5, 1998

[54] CIRCUIT AND METHOD FOR PREVENTING LASER JAMMING OF NIGHT VISION GOGGLES

[75] Inventors: Kevin G. Kintz, McKinney, Tex.; Mark D. Rogers, Ballwin, Mo.

[73] Assignee: McDonnell Douglas Corporation, St. Louis, Mo.

[21] Appl. No.: 697,875

[22] Filed: Aug. 30, 1996

[51] Int. Cl.$^6$ ............................. H01J 40/14; H01J 31/50
[52] U.S. Cl. ............................. 250/214 VT; 250/214 R; 313/523; 315/159
[58] Field of Search ............................. 250/214 VT, 214 AL, 250/214 R; 313/523, 529, 537; 315/158, 159

[56] References Cited

U.S. PATENT DOCUMENTS

| | | | |
|---|---|---|---|
| 4,882,481 | 11/1989 | Gilligan et al. | 250/214 VT |
| 4,960,988 | 10/1990 | Simms | 250/214 VT |
| 5,280,167 | 1/1994 | Dubois | 250/214 |
| 5,382,200 | 1/1995 | Barrett et al. | 250/214 VT |
| 5,387,933 | 2/1995 | Fouilloy et al. | 348/294 |

Primary Examiner—Edward P. Westin
Assistant Examiner—Kevin Pyo
Attorney, Agent, or Firm—Robert Westerlund

[57] ABSTRACT

A method for preventing laser jamming of night vision goggles having a gated image intensifier device and a display for displaying an intensified image of a scene. The method includes the steps of detecting laser pulses from a jamming laser source and producing respective electrical pulses in response thereto, and gating off the gated image intensifier device in synchronism with the electrical pulses in order to thereby prevent the laser pulses from affecting the intensified image of the scene displayed by the display. The step of gating off the gated image intensifier device is preferably carried out by using a phase locked loop to produce a PLL output signal synchronized with the laser pulses, conditioning the PLL output signal to produce a conditioned PLL output signal, comparing the conditioned PLL output signal with a prescribed reference voltage to generate a comparator output signal having a first level when the PLL output signal is greater than a prescribed reference voltage, and a second level when the PLL output signal is not greater than the prescribed reference voltage, generating a pulse train in response to the comparator output signal, and applying the pulse train to the gated intensifier device. The step of detecting laser pulses from the jamming laser source is preferably carried out by using a photodetector device to detect the laser pulses and to produce rounded electrical pulses corresponding to the detected laser pulses, and squaring the rounded electrical pulses to produce the electrical pulses, wherein the electrical pulses comprise square electrical pulses. Also disclosed is a circuit for implementing the above-described method for preventing laser jamming of night vision goggles.

17 Claims, 1 Drawing Sheet

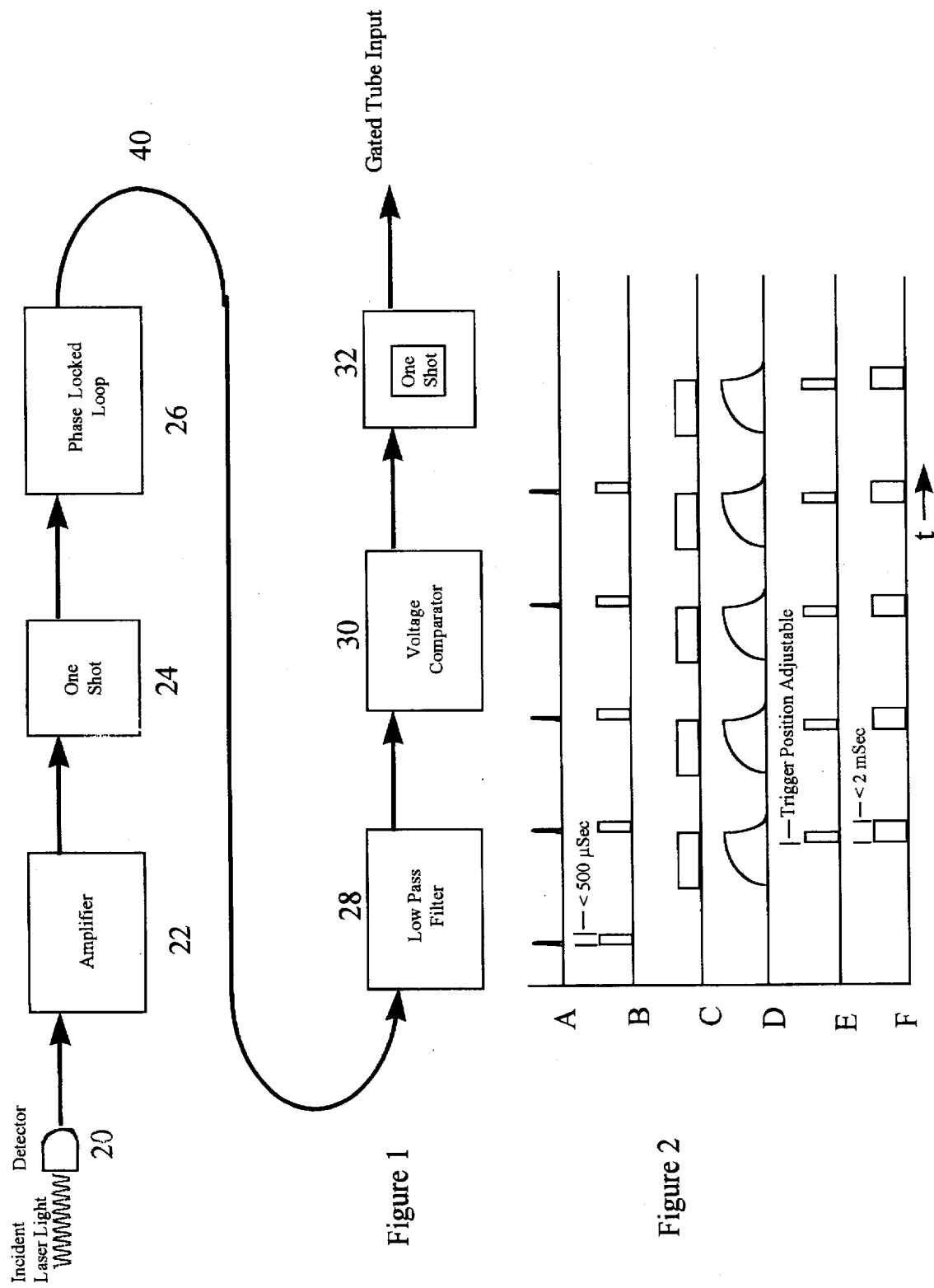

CIRCUIT AND METHOD FOR PREVENTING LASER JAMMING OF NIGHT VISION GOGGLES

BACKGROUND OF THE INVENTION

The present invention relates generally to the field of night vision goggles, and, more particularly, to a circuit and method for preventing laser jamming of night vision goggles.

Night vision goggles (NVGs) have gained notoriety since their deployment in the Persian Gulf war. Basically, night vision goggles have a phosphor screen display on which is formed an intensified image of a scene being viewed by the wearer. The intensified image of the scene is created by means of an image intensifier device which drives the phosphor elements of the phosphor screen. The image intensifier device generally amplifies infrared radiation from the scene being viewed, thereby dramatically improving the brightness of the scene being viewed by the wearer of the night vision goggles, and thus making possible activities at night time which were impossible or impractical prior to the advent of night vision goggles.

Some of the most prevalent uses of night vision goggles are for military aircrew performing night-time bombing missions, police helicopter pilots performing night-time manhunt operations, and Coast Guard crew performing night-time anti-drug trafficking operations. An obvious countermeasure to such uses of night vision goggles is to use a laser(s) to produce laser pulses to interfere with or "jam" the night vision goggles of mission-critical personnel. In this connection, it is now possible to jam current night vision goggles with relatively inexpensive jamming laser sources.

Thus, current night vision goggles do not afford protection against laser jamming. Although gated image intensifier tubes are presently available, they require a cooperative laser source such as the aircraft's own laser range finder, and are not effective against hostile or "non-cooperative" laser jamming.

Based on the above and foregoing, it can be appreciated that there presently exists a need in the art for a circuit and method for preventing laser jamming of night vision goggles. The present invention fulfills this need in the art.

SUMMARY OF THE INVENTION

The present invention encompasses a method for preventing laser jamming of night vision goggles having a gated image intensifier device and a display for displaying an intensified image of a scene. The method includes the steps of detecting laser pulses from a jamming laser source and producing respective electrical pulses in response thereto, and gating off the gated image intensifier device in synchronism with the electrical pulses in order to thereby prevent the laser pulses from affecting the intensified image of the scene displayed by the display.

The step of gating off the gated image intensifier device is preferably carried out by using a phase locked loop to produce a PLL output signal synchronized with the laser pulses, comparing the PLL output signal with a prescribed reference voltage to generate a comparator output signal having a first level when the PLL output signal is greater than a prescribed reference voltage, and a second level when the PLL output signal is not greater than the prescribed reference voltage, and applying the comparator output signal to the gated image intensifier device.

The step of gating off the gated image intensifier device is most preferably carried out by using a phase locked loop to produce a PLL output signal synchronized with the laser pulses, conditioning the PLL output signal to produce a conditioned PLL output signal, comparing the conditioned PLL output signal with a prescribed reference voltage to generate a comparator output signal having a first level when the PLL output signal is greater than a prescribed reference voltage, and a second level when the PLL output signal is not greater than the prescribed reference voltage, generating a pulse train in response to the comparator output signal, and applying the pulse train to the gated intensifier device.

The step of detecting laser pulses from the jamming laser source is preferably carried out by using a photodetector device to detect the laser pulses and to produce rounded electrical pulses corresponding to the detected laser pulses, and squaring the rounded electrical pulses to produce the electrical pulses, wherein the electrical pulses comprise square electrical pulses.

The present invention also encompasses a circuit for implementing the above-described method of the present invention for preventing laser jamming of night vision goggles. The circuit includes a first circuit for detecting laser pulses from the jamming laser source and producing respective electrical pulses in response thereto, and a second circuit for gating off the gated image intensifier device in synchronism with the electrical pulses in order to thereby prevent the laser pulses from affecting the intensified image of the scene displayed by the display.

In the presently preferred embodiment of the present invention, the second circuit includes a phase locked loop to produce a PLL output signal synchronized with the electrical pulses, a conditioning circuit for conditioning the PLL output signal to produce a conditioned PLL output signal, a comparator circuit for comparing the conditioned PLL output signal with a prescribed reference voltage to generate a comparator output signal having a first level when the PLL output signal is greater than a prescribed reference voltage, and a second level when the PLL output signal is not greater than the prescribed reference voltage, a pulse train generator circuit for generating a pulse train in response to the comparator output signal, and facilities for applying the pulse train to the gated intensifier device.

BRIEF DESCRIPTION OF THE DRAWINGS

These and other objects, features, and advantages of the present invention will become apparent from the following detailed description taken in conjunction with the accompanying drawings, in which:

FIG. 1 is a block diagram of a circuit for preventing laser jamming of night vision goggles constructed in accordance with a presently preferred embodiment of the present invention; and, FIG. 2 is a timing diagram depicting the various signals produced by the various elements of the circuit shown in FIG. 1, in order to facilitate an understanding of the operation of the circuit shown in FIG. 1.

DETAILED DESCRIPTION OF THE INVENTION

With reference now to FIG. 1, there can be seen a block diagram of a circuit for preventing laser jamming of night vision goggles, constructed in accordance with a presently preferred embodiment of the present invention. As can be seen in FIG. 1, incident laser light from a jamming laser source, in the form of laser pulses, e.g., having a frequency in the range of 4–40 Hz and a wavelength ($\lambda$) in the range of 400–1100 nanometers (nm), is detected by a photosensitive or photoconductive detector 20 of any convenient type, e.g., a photodiode device. The detector 20 converts the jamming laser pulses into respective electrical pulses which are preferably amplified by an amplifier 22. As will be readily apparent to those skilled in the pertinent art, the detector 20 and amplifier 22 can be integrated in the form of a combined detector/amplifier.

The output of the amplifier 22 is preferably a train of rounded electrical pulses as shown on Line A of the timing diagram of FIG. 2 corresponding to the train of jamming laser pulses. The rounded electrical pulses are preferably applied to a one-shot 24, which squares the rounded electrical pulses output by the amplifier 22 to produce a corresponding train of square electrical pulses, as shown on Line B of the timing diagram of FIG. 2. The square electrical pulses output by the one-shot 24 preferably have a duration of less than 500 µs, and are preferably applied to a phase locked loop 26, which preferably outputs a 50% duty cycle square wave synchronized with the incoming pulse train, as shown on Line C of the timing diagram of FIG. 2.

The square wave output of the phase locked loop 26 is preferably applied to a low-pass filter 28, which low-pass filters the square wave output by the phase locked loop 26 to produce an RC charge/decay wave, as shown on Line D of the timing diagram of FIG. 2. The RC charge/decay wave output by the low-pass filter 28 is preferably applied to a comparator 30. The comparator 30 is preferably configured to produce a square pulse that is on as long as the voltage of the RC charge/decay wave output by the comparator 30 is higher than a prescribed (set) threshold voltage level, as shown on Line E of the timing diagram of FIG. 2. Most preferably, the prescribed threshold voltage level (i.e., the trigger voltage/position for the comparator 30) is adjustable for reasons which will be developed hereinafter.

The square pulse output of the comparator 30 is preferably passed through a capacitor and diode rectifier (not shown) which can either be integrated with the comparator 30 or provided as a separate circuit element, to thereby produce a single positive spike pulse coincident with the rising edge of each square pulse produced by the comparator 30. The resultant train of spike pulses produced by the capacitor and diode rectifier is preferably applied to a one-shot 32, which outputs a corresponding train of square pulses having a prescribed amplitude and duration (e.g., 1–2 millisecond square pulses having an amplitude of 5 volts), as shown on Line F of the timing diagram of FIG. 2.

The square pulses generated by the one-shot 32 are applied to the input of the gated image intensifier tube of the night vision goggles, in order to gate off the image intensifier tube in synchronism with the incoming train of jamming laser pulses, to thereby prevent the jamming laser pulses from affecting the intensified image of the scene being displayed by the phosphor screen (display) of the night vision goggles. Thus, the circuit 40 consisting of the detector 20, the amplifier 22, the one-shot 24, the phase locked loop 26, the low-pass filter 28, the voltage comparator 30, and the one-shot 32 effectively blocks the incoming train of jamming laser pulses, thereby defeating the laser jamming countermeasure.

As will be readily appreciated by those skilled in the pertinent art, since the image intensifier tube of the night vision goggles is only gated off for only 1–2 ms, at a repetition frequency of 4–40 Hz, the gating off of the image intensifier tube is completely transparent to the wearer of the night vision goggles, i.e., the display is flicker-free. Thus, the wearer of the night vision goggles notices no flicker and no change in the observed image displayed on the phosphor screen display. Otherwise stated, the flashing laser pulses from the jamming laser source are effectively removed from the image of the scene displayed on the phosphor screen display of the night vision goggles, with the scene otherwise remaining intact. Therefore, the wearer of the night vision goggles employing the method and circuit of the present invention will be able to continuously view the observed scene, without interruption, and without noticing any degradation in the image viewed on the display, even in the face of incoming jamming laser pulses from a hostile source.

It will also be readily appreciated by those skilled in the pertinent art that the wearer of the night vision goggles can selectively choose the trigger point of the comparator 30 of the circuit 40 by selectively adjusting the threshold voltage level thereof, as discussed previously, to thereby vary the point at which the gated image intensifier tube of the night vision goggles is gated off, e.g., based upon what the wearer observes on the phosphor screen display of the night vision goggles. Thus, the "OFF" pulses generated by the circuit 40 for gating off the image intensifier tube can be tuned in time by the wearer to most effectively block any incoming jamming laser pulses.

Although a presently preferred embodiment of the circuit and method of the present invention has been described in detail hereinabove, it should be clearly understood that many variations and/or modifications of the basic inventive concepts herein taught which may appear to those skilled in the pertinent art will still fall within the spirit and scope of the present invention as defined in the appended claims.

What is claimed is:

1. A method for preventing laser jamming of night vision goggles having a gated image intensifier device and a display for displaying an intensified image of a scene, including the steps of:

detecting laser pulses, wherein the gating step includes the sub-steps of:
      using a phase locked loop to produce a PLL output signal synchronized with said laser pulses;
      comparing said PLL output signal with a prescribed reference voltage to generate a comparator output signal having a first level when said PLL output signal is greater than said prescribed reference voltage, and a second level when said PLL output signal is not greater than said prescribed reference voltage; and,
      applying said comparator output signal to said gated image intensifier device.

2. The method as set forth in claim 1, wherein said PLL output signal comprises a square wave having a 50% duty cycle.

3. A method for preventing laser jamming of night vision goggles having a gated image intensifier device and a display for displaying an intensified image of a scene, including the steps of:

detecting laser pulses and producing respective electrical pulses in response thereto; and,
   gating off the gated image intensifier device in synchronism with said electrical pulses in order to thereby prevent said laser pulses from affecting the intensified image of the scene displayed by the display, wherein the gating step includes the sub-steps of:
      using a phase locked loop to produce a PLL output signal synchronized with said electrical pulses;
      conditioning said PLL output signal to produce a conditioned PLL output signal;

comparing said conditioned PLL output signal with a prescribed reference voltage to generate a comparator output signal having a first level when said PLL output signal is greater than said prescribed reference voltage, and a second level when said PLL output signal is not greater than said prescribed reference voltage;

generating a pulse train in response to said comparator output signal; and, applying said pulse train to said gated image intensifier device.

4. The method as set forth in claim 3, wherein the detecting step includes the sub-steps of:

using a photodetector device to detect said laser pulses and to produce rounded electrical pulses corresponding to the detected laser pulses; and, squaring said rounded electrical pulses to produce said electrical pulses, wherein said electrical pulses comprise square electrical pulses.

5. The method as set forth in claim 4, wherein the conditioning sub-step is carried out using a low-pass filter, to thereby convert said square electrical pulses into said conditioned PLL output signal, wherein said conditioned PLL output signal comprises an RC charge/decay wave.

6. The method as set forth in claim 5, wherein the sub-step of generating a pulse train comprises the sub-steps of:

using a spike pulse generator circuit to produce spike pulses coincident with transitions of said comparator output signal from said second level to said first level; and, producing said pulse train in response to said spike pulses.

7. The method as set forth in claim 1, wherein said prescribed reference voltage is adjustable.

8. The method as set forth in claim 5, wherein said prescribed reference voltage is adjustable.

9. A circuit for preventing laser jamming of night vision goggles having a gated image intensifier device and a display for displaying an intensified image of a scene, including:

means for detecting laser pulses and producing respective electrical pulses in response thereto; and, means for gating off the gated image intensifier device in synchronism with said electrical pulses in order to thereby prevent said laser pulses from affecting the intensified image of the scene displayed by the display, wherein the gating means includes:

a phase locked loop for producing a PLL output signal synchronized with said laser pulses;

means for comparing said PLL output signal with a prescribed reference voltage to generate a comparator output signal having a first level when said PLL output signal is greater than said prescribed reference voltage, and a second level when said PLL output signal is not greater than said prescribed reference voltage; and, means for applying said comparator output signal to said gated image intensifier device.

10. The circuit as set forth in claim 9, wherein said PLL output signal comprises a square wave having a 50% duty cycle.

11. A circuit for preventing laser jamming of night vision goggles having a gated image intensifier device and a display for displaying an intensified image of a scene, including:

means for detecting laser pulses and producing respective electrical pulses in response thereto; and, means for gating off the gated image intensifier device in synchronism with said electrical pulses in order to thereby prevent said laser pulses from affecting the intensified image of the scene displayed by the display, wherein the gating means includes:

a phase locked loop for producing a PLL output signal synchronized with said laser pulses;

means for conditioning said PLL output signal to produce a conditioned PLL output signal;

means for comparing said conditioned PLL output signal with a prescribed reference voltage to generate a comparator output signal having a first level when said conditioned PLL output signal is greater than said prescribed reference voltage, and a second level when said conditioned PLL output signal is not greater than said prescribed reference voltage;

means for generating a pulse train in response to said comparator output signl; and, means for applying said pulse train to said gated image intensifier device.

12. The circuit as set forth in claim 11, wherein said detecting means includes:

a photodetector device to detect said laser pulses and to produce rounded electrical pulses corresponding to the detected laser pulses; and, means for squaring said rounded electrical pulses to produce said electrical pulses, wherein said electrical pulses comprise square electrical pulses.

13. The circuit as set forth in claim 12, wherein:

said squaring means comprises a one-shot; and, said conditioning means comprises a low-pass filter.

14. The circuit as set forth in claim 13, wherein said prescribed reference voltage is adjustable.

15. A circuit for preventing laser jamming of night vision goggles having a gated image intensifier device and a display for displaying an intensified image of a scene, including:

a first circuit for detecting laser pulses and producing respective electrical pulses in response thereto; and, a second circuit for gating off the gated image intensifier device in synchronism with said electrical pulses in order to thereby prevent said laser pulses from affecting the intensified image of the scene displayed by the display, wherein said second circuit includes:

a phase locked loop for producing a PLL output signal synchronized with said laser pulses;

a comparator circuit for comparing said PLL output signal with a prescribed reference voltage to generate a comparator output signal having a first level when said PLL output signal is greater than said prescribed reference voltage, and a second level when said PLL output signal is not greater than said prescribed reference voltage; and, means for applying said comparator output signal to said gated image intensifier device.

16. The circuit as set forth in claim 15, wherein said PLL output signal comprises a square wave having a 50% duty cycle.

17. A circuit for preventing laser jamming of night vision goggles having a gated image intensifier device and a display for displaying an intensified image of a scene, including:

means for detecting laser pulses and producing respective electrical pulses in response thereto; and, means for gating off the gated image intensifier device in synchronism with said electrical pulses in order to thereby prevent said laser pulses from affecting the intensified image of the scene displayed by the display, wherein said second circuit includes:

a phase locked loop to produce a PLL output signal synchronized with said electrical pulses;

a conditioning circuit for conditioning said PLL output signal to produce a conditioned PLL output signal;

a comparator circuit for comparing said conditioned PLL output signal with a prescribed reference voltage to generate a comparator output signal having a first level when said conditioned PLL output signal is greater than said prescribed reference voltage, and a second level when said conditioned PLL output signal is not greater than said prescribed reference voltage;

a pulse train generator circuit for generating a pulse train in response to said comparator output signal; and, means for applying said pulse train to said gated image intensifier device.

* * * * *